United States Patent [19]

Cover

[11] 4,256,692
[45] Mar. 17, 1981

[54] MEMBRANE OXYGENATOR

[75] Inventor: Walter E. Cover, Mission Viejo, Calif.

[73] Assignee: C. R. Bard, Inc., Murray Hill, N.J.

[21] Appl. No.: 8,600

[22] Filed: Feb. 1, 1979

[51] Int. Cl.³ .............................................. A61M 1/03
[52] U.S. Cl. .............................. 422/46; 128/DIG. 3; 210/450; 210/321.4; 422/48
[58] Field of Search ............ 422/46, 48; 128/DIG. 3; 261/DIG. 28; 210/450, 321 B

[56] References Cited

U.S. PATENT DOCUMENTS

| | | | |
|---|---|---|---|
| 865,691 | 9/1907 | Fox | 210/450 X |
| 3,060,934 | 10/1962 | Claff et al. | 422/48 |
| 3,413,095 | 11/1968 | Bramson | 422/46 |
| 3,520,803 | 7/1970 | Raconelli | 210/321 R X |
| 3,564,819 | 2/1971 | Neulander et al. | 210/321 B X |
| 3,594,130 | 7/1971 | North | 422/48 |
| 3,834,544 | 9/1974 | Tyson et al. | 422/46 X |
| 3,839,204 | 10/1974 | Ingenito et al. | 422/48 X |
| 3,979,297 | 9/1976 | Bardin et al. | 210/232 |
| 3,998,593 | 12/1976 | Yoshida et al. | 422/46 |
| 4,154,792 | 5/1979 | Miller et al. | 422/48 |
| 4,168,293 | 9/1979 | Bramson | 422/48 X |

Primary Examiner—Barry S. Richman

Attorney, Agent, or Firm—Richard H. Zaitlen

[57] ABSTRACT

A membrane device having particular utility as a blood oxygenator is disclosed. The device comprises a housing having an oxygen inlet and outlet, a blood inlet and outlet, and a water inlet and outlet. A plurality of blood modules and water modules are arranged in a predetermined configuration in the housing. Each of the blood modules is in flow communication with the blood inlet and outlet on the housing and defines a flow path for the blood through the housing and across each of the blood modules. The water modules are in flow communication with the water inlet and outlet on the housing and define a flow path for the water through the housing and across each of the water modules. The blood modules and water modules are arranged and configured in a specific and predetermined configuration so as to form a pathway for introducing oxygen between adjacent modules. By the use of the membrane device of the present invention, problems of accidental rupture of either a blood module or a water module is substantially reduced. In addition, should such an accidental rupture take place, the flow path of the leakage through the device is such that it is extremely unlikely for water and blood to mix.

16 Claims, 11 Drawing Figures

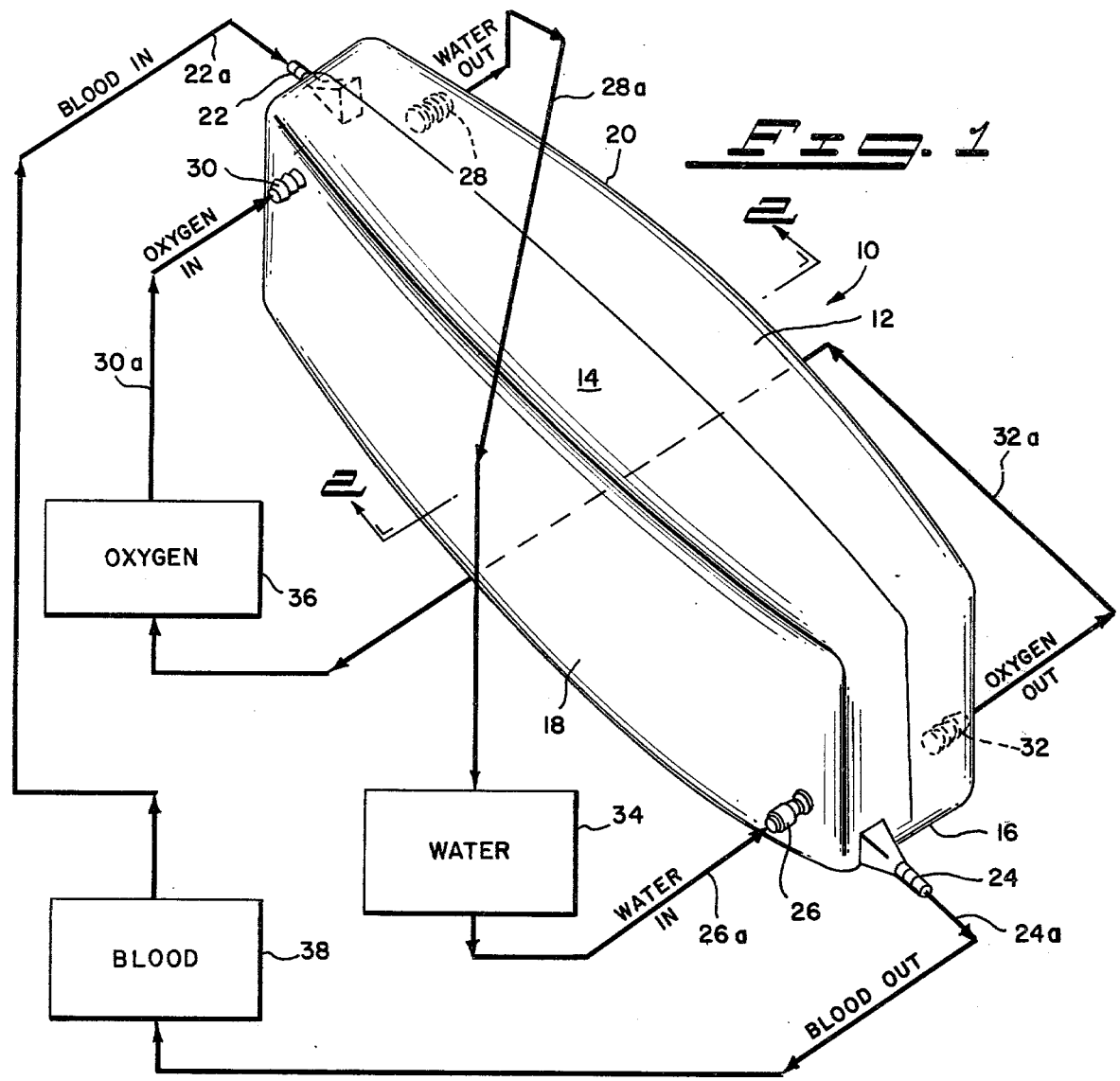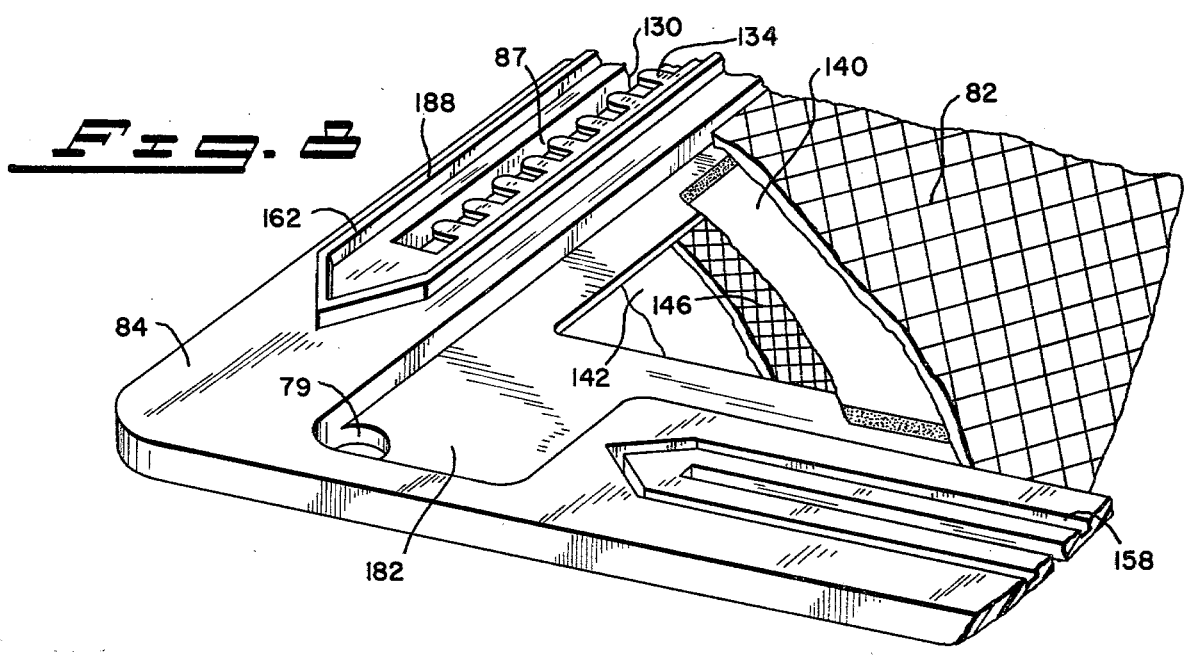

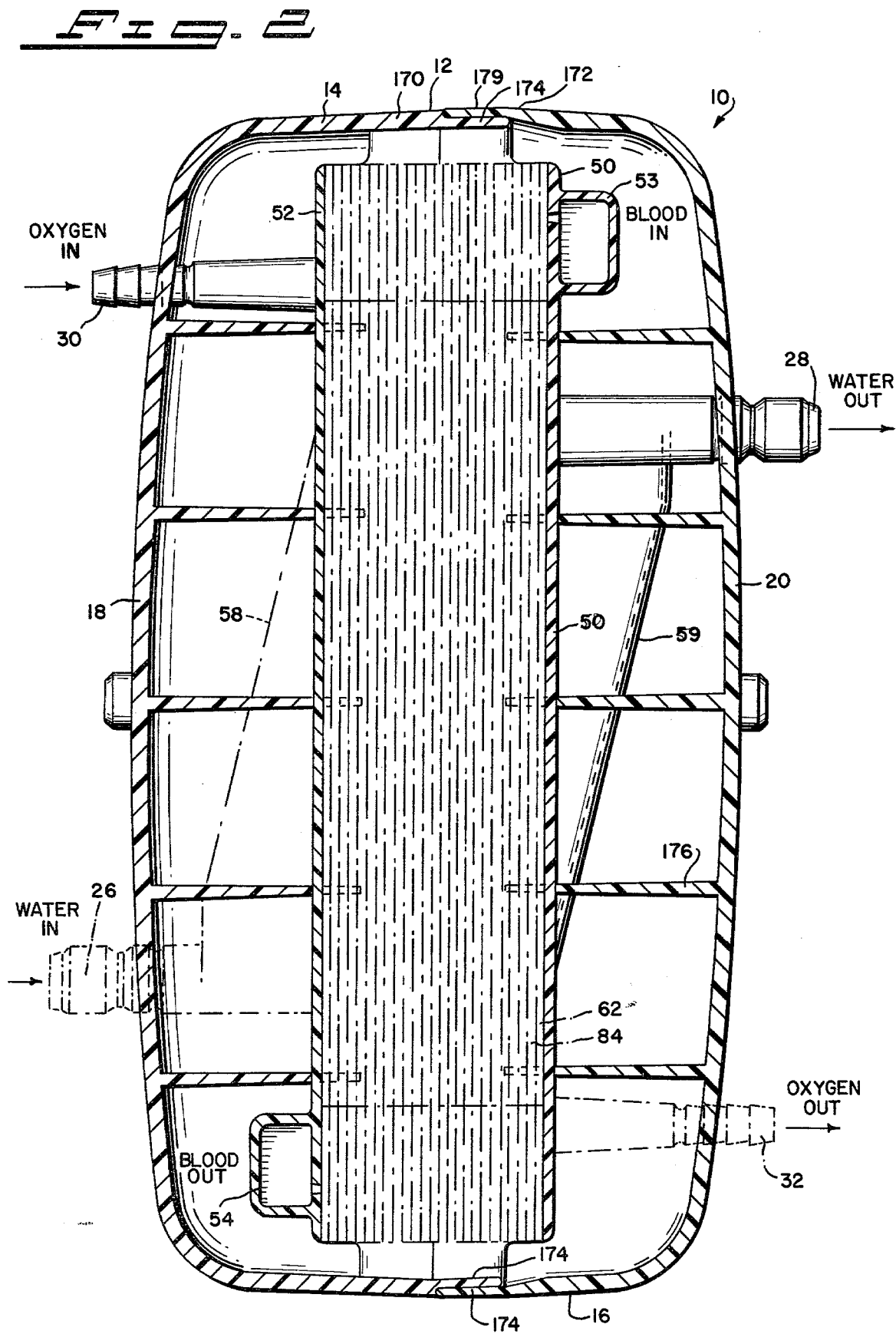

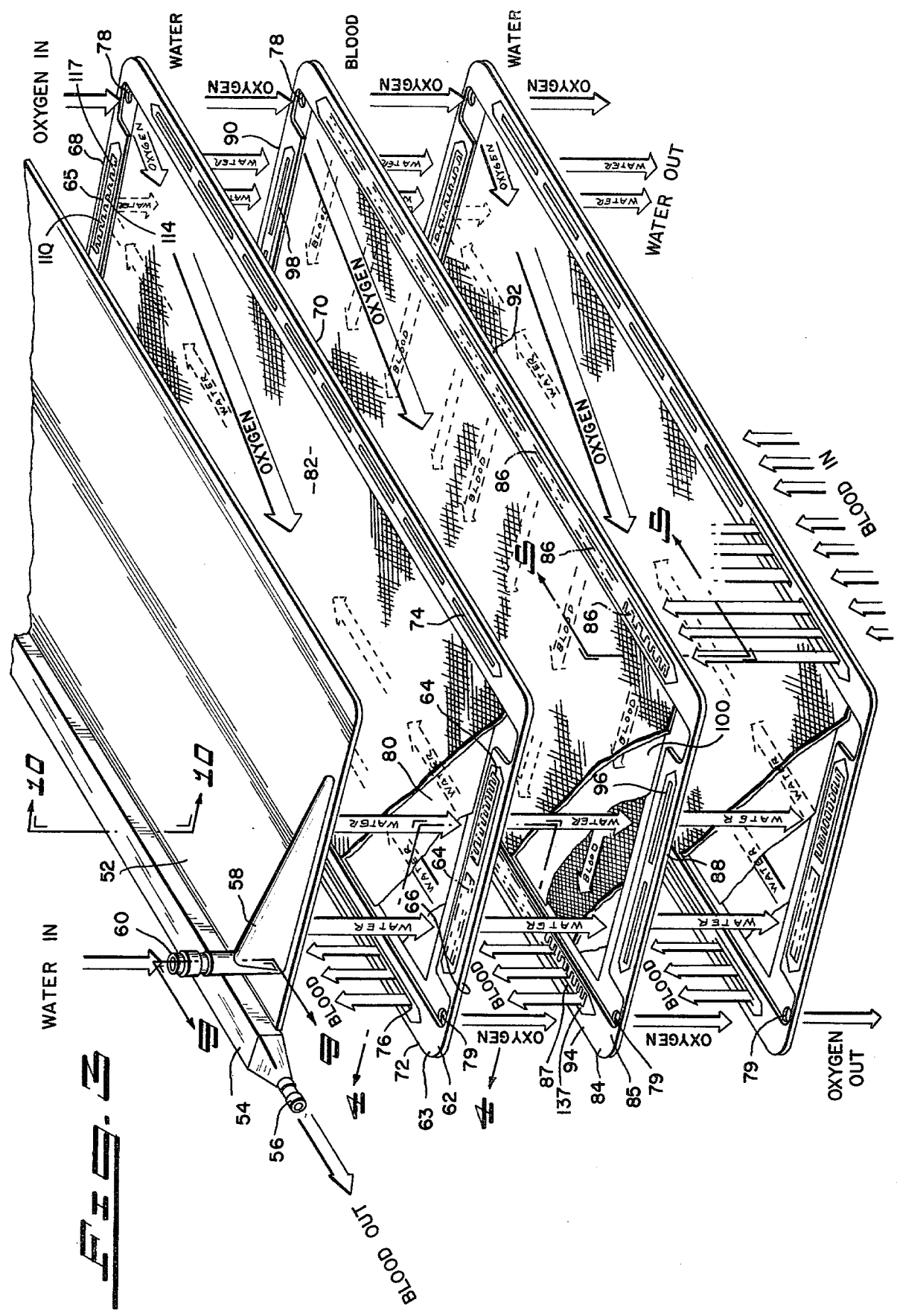

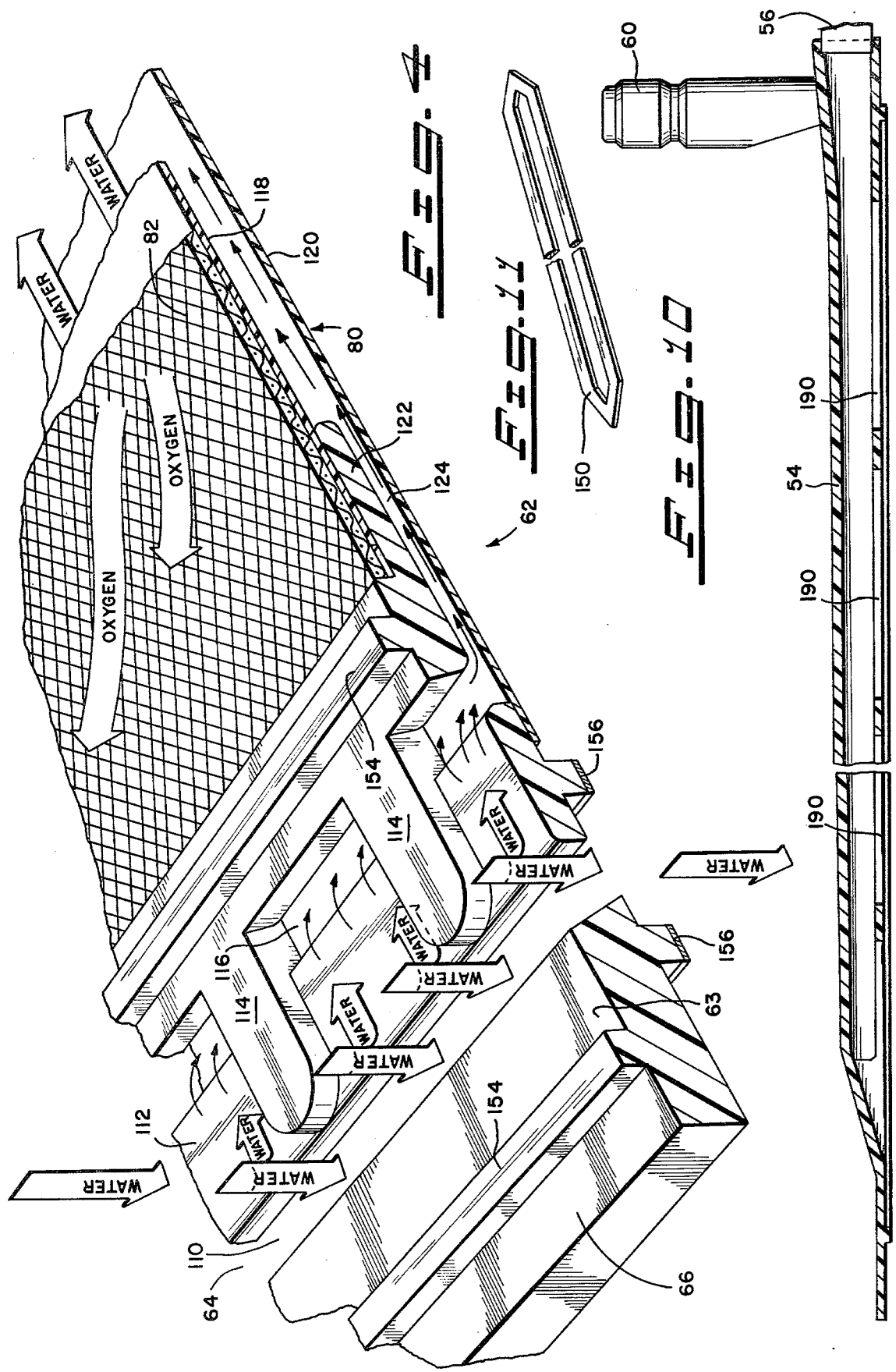

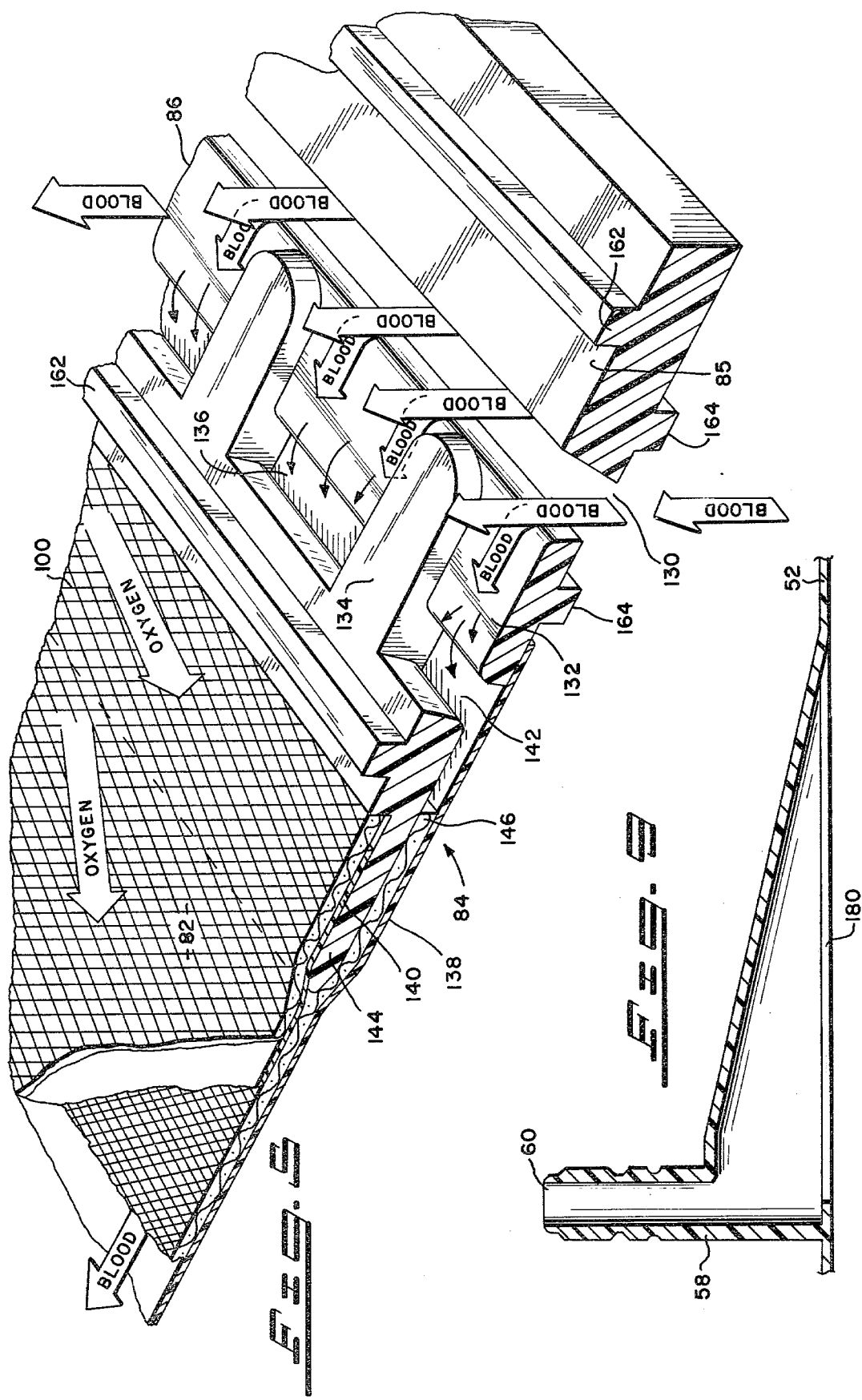

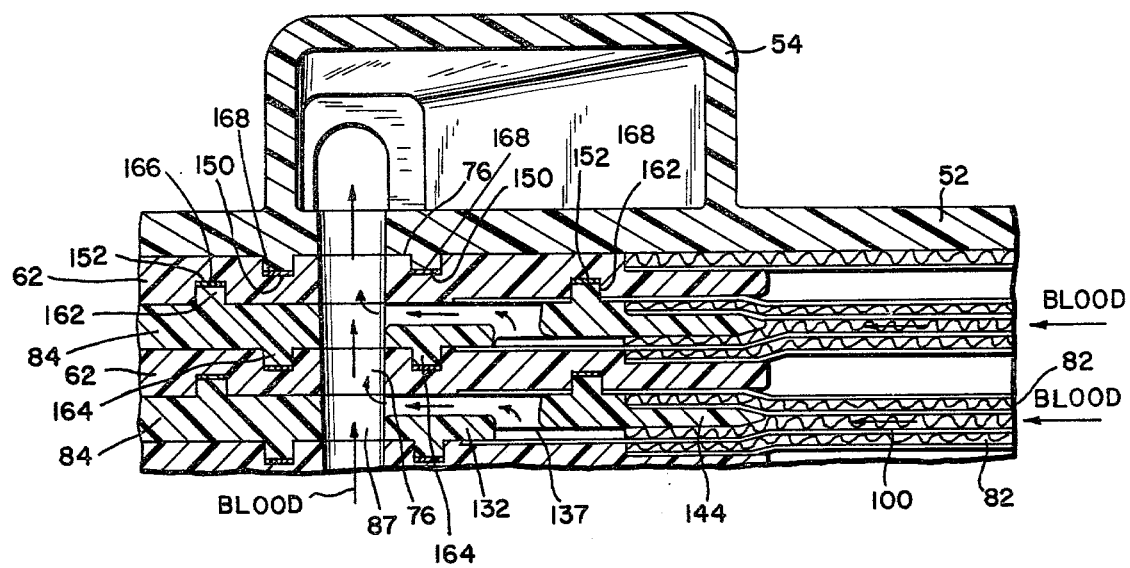
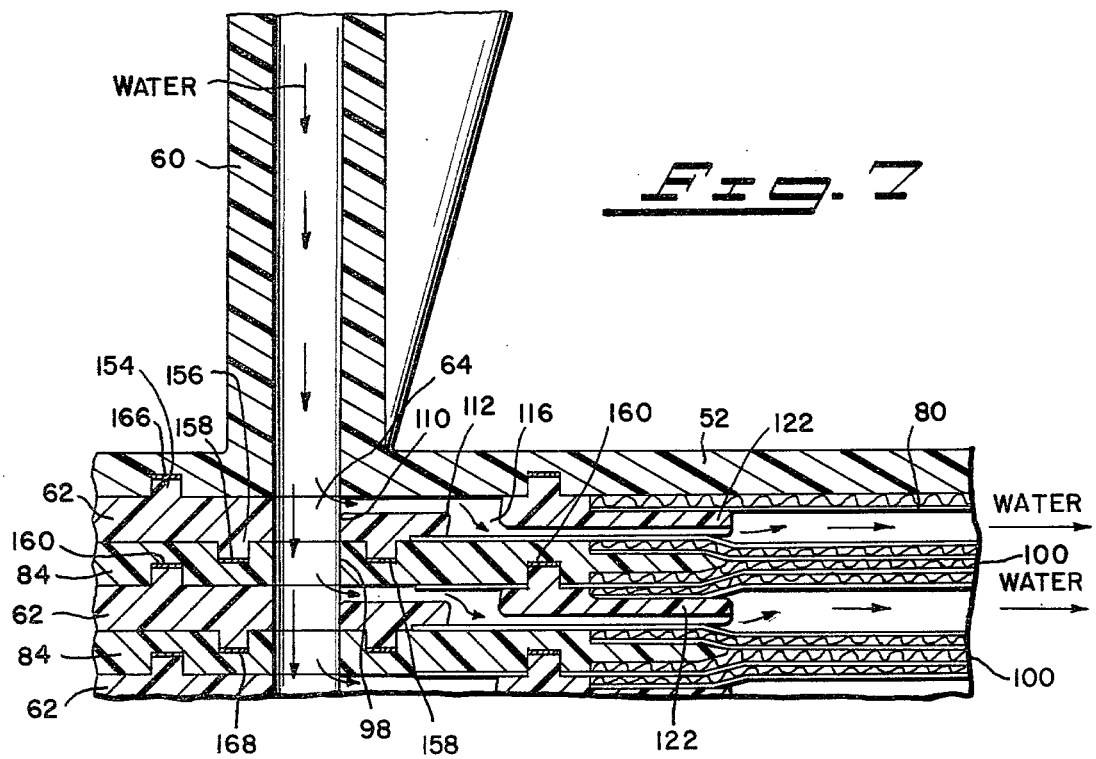

MEMBRANE OXYGENATOR

BACKGROUND OF THE INVENTION

1. Field of the Invention

This invention relates to the field of membrane devices, and more particularly, to a disposable blood oxygenator of the membrane type.

2. Prior Art

It is well recognized in the medical arts that the need to oxygenate the blood, especially during extensive surgical procedures, is of great importance. The reason for the need for this oxygenation is because often times the patient's heart and lungs may either be out of action, such as during open heart surgery, or may be impaired due to a specific disease or the trauma of the surgery. Thus, the patient can only be kept alive if the heart and lungs are taken over by a machine in such a manner that the blood can be aerated and returned to the body. Various artificial heart and lung machines have been devised to accomplish this need. With respect to those machines designed to oxygenate the blood, they all tend to suffer from a number of different shortcomings which has lead to problems inherent in each device. Moreover, even in those few devices which properly oxygenate the blood, i.e. membrane-type oxygenators, they are extremely expensive and/or complex in nature. This, however, is not to be considered a great criticism of these prior art devices inasmuch as the actions taking place in the lungs on the blood is extremely complex. The fact that prior art devices are complex is therefore not surprising.

During surgery, the prior art devices designed to oxygenate the blood, circulated the venus blood (the blood which has had the oxygen removed and is now on its pathway back to the heart) through an oxygenator where oxygen is added, and preferably, carbon dioxide and other impurities are removed. The now oxygenated blood is then returned to the patient's artery (the arteries form the pathway through the body for blood which has been oxygenated). In the past, the oxygenator-of-choice is a device referred to as a bubble oxygenator in which the blood is brought into direct contact with oxygen. One problem with such device, however, is that the large blood-gas interfaces present in such apparatus are believed to damage the blood thereby limiting perfusion with such devices to relatively short time periods. In a membrane oxygenator, the oxygen and blood are separated by a membrane through which the oxygen to the blood and carbon dioxide from the blood diffuse and thus the problem associated with direct exposure of the blood to the oxygen is eliminated. On the other hand, bubble-type oxygenators are simple and especially for that reason they are widely used notwithstanding both their time limitation and the possible damage to the blood.

However, as the ability to perform more difficult operations increases, i.e. various forms of open heart surgery, organ replacement, and the like, the need for a device which can be used in the course of lengthy surgery, (five hours or more) has lead to the use of the more complex and costly membrane oxygenator. Further, it is presently believed in the art that membrane oxygenators also meet various other advantageous criteria. For example, they provide good gas transfer rates and tend to minimize the trauma to the blood, they do not require large priming volumes, they are more easily regulated in terms of blood flow to and from the patient, they enable oxygenation to take place without direct mixing of the oxygen with blood, and they may include various heat transfer means such that the blood can be selectively heated or cooled depending on the surgical procedure.

However, there are still a number of problems with membrane oxygenators. For example, the transfer of oxygen to the venous blood should balance the excretion of the carbon dioxide from the blood. One problem with prior art membrane devices was that the carbon dioxide diffused through the membrane at a different rate than the oxygen. Further, the blood may form a stagnant boundary layer adjacent the membrane. A membrane oxygenator designed to overcome these problems is described in U.S. Pat. No. 3,413,095. That oxygenator is described as being made up of a plurality of cells, each of which include a pair of spaced apart membranes between which the blood flows. A foraminous spacing member or screen is used to separate the membranes and to provide turbulence in the blood flow sufficient to break up or reduce the thickness of the boundary layer of blood adjacent to the membrane surface. Oxygen is caused to flow across the outer surface of the membranes and to diffuse into the blood. Various water mattresses or jackets are located on the outer sides of the membranes and are separated by foraminous spacing members through which the oxygen flows along the membrane. The water is maintained in the water jacket at a higher pressure than the blood and oxygen in such a manner that the membranes and blood and oxygen-spacing members are all clamped together into intimate contact so as to ensure a constant and small blood volume in each of the cells. A more detailed review of the U.S. Pat. No. 3,413,095 reveals, however, a device of relatively great complexity which suffers the shortcomings of being expensive, and therefore is generally taken apart, cleaned and reassembled with new membranes after each use.

In another prior art device disclosed in U.S. Pat. No. 3,564,819, a membrane oxygenator is shown which also configures a plurality of membranes so as to define a first and second group of flow volumes. Discontinuous channels extend transversely between adjacent membranes. Each channel places a pair of adjacent flow volumes of the same group into flow communication, while the gas-tight wall defining each channel bonds together the portion of the spacing means embedded therein and portions of the membranes located at each end of the wall. Again, a close analysis of the U.S. Pat. No. 3,564,819 reveals a device of substantial complexity, and while it may be good for the specific purposes taught therein, suffers significant shortcomings.

Yet another prior art device is disclosed in U.S. Pat. No. 3,834,544. That patent is directed to a membrane-type blood oxygenator of the disposable type, i.e. sufficiently inexpensive to manufacture so that it can be used once and discarded. The distinct drawback with such device, however, in addition to its complexity, is that it is susceptible to inadvertent leakage of the water into the blood. This presents a significant shortcoming in that when water mixes with blood, it can cause hemolysis which can be extremely harmful to the patient. Even the possibility of such catastrophe is sufficient to represent significant drawbacks with respect to any such device. In addition, a review of U.S. Pat. No. 3,834,544 will indicate that a plurality of clamps are needed to keep the various compartments leak-proof, but these cumbersome clamps present structural problems in addition to the other problems discussed hereinabove.

Other prior art devices are shown in U.S. Pat. Nos. 3,998,593, 3,979,297 and 3,520,803.

The present invention is directed to a membrane oxygenator of the disposable type which contains none of the aforementioned shortcomings discussed with respect to the prior art devices. The device of the present invention comprises a series of water modules and blood modules arranged in a predetermined configuration which are so designed as to substantially reduce the possibility of mixing of the water flow with the blood flow. The modular construction substantially reduces the number of parts, and the method of joining and sealing the various components and does away with cumbersome clamps. This enables the device of the present invention to be manufactured at a relatively low cost such that it can be disposed of after one use.

SUMMARY OF THE INVENTION

The present invention is directed to an improved membrane blood oxygenator of the disposable type. One of the specific improvements of the present invention over the prior art is the fact that the blood circuit, water circuit and oxygen circuit are designed such that the problem of accidental leakage of the water circuit into the blood circuit is substantially precluded. One basis for this advantage is that the water and blood circuits operate at pressures higher than the pressure in the oxygen circuit, and the water and blood circuits are so designed that any leakage from the water circuit will either be to the exterior of the apparatus or into the oxygen circuit. This is further achieved by the specific configuration associated with the water modules and blood modules which form the flow paths for the blood, water and oxygen through the device.

The blood oxygenator of the present invention comprises a generally rectangular housing which sandwiches first and second cover members about a plurality of water modules and blood modules. The water modules and blood modules are arranged in an alternating configuration with the first and last module in the configuration being a water module. Each water module comprises a water frame having a water inlet passageway and a water outlet passageway in flow communication with a water-impervious envelope suspended within the water frame. Each of the blood modules comprises a blood frame having a blood inlet passageway and a blood outlet passageway in flow communication with a gas-permeable blood envelope suspended within the blood frame. The housing is configured so as to permit blood to enter the housing and to flow transversely across both the water modules and the blood modules. When the blood passes through each of the water modules, it is prevented from contacting the water by a uniquely shaped blood through port. When the blood passes across each of the blood modules, a portion of the blood travels through the blood envelope. The blood envelope is made of gas-permeable material and as oxygen is caused to flow across the blood envelope, removal of carbon dioxide from the blood and transfer of oxygen to the blood is achieved. As the blood exits out of the blood envelope, it is caused to flow along an outlet flow channel formed by the water and blood modules. The outlet flow channel guides the blood out of the housing through an outlet port. Water, in turn, is caused to enter the housing and passes through each of the blood modules where it is also prevented from mixing with the blood by uniquely shaped water through ports. When the water crosses a water module, a portion of the water is caused to flow across the water envelope and to exit out of the housing along a water outlet channel. The blood modules and water modules are joined together in such a manner so as to permit oxygen to flow therebetween. Further, the configuration of the modules is such that should a leak of blood or water occur, the leak is encouraged to flow out of the housing along the oxygen pathway and away from the envelopes.

The water modules also perform a number of other functions in the device of the present invention. Besides positioning and retaining the blood modules therebetween, the temperature of the water can be regulated so as to regulate the temperature of the blood. During heart surgery with extracorporeal circulation, the blood temperature may drop below the body temperature of the patient. It may therefore be desirable to raise the temperature of the blood by heating the water stream through the housing. In some surgeries, however, it may be desirable to cool the blood. In either event, the present invention enables the blood temperature to be regulated by heating/cooling the water. The water-blood-water module configuration causes the blood to flow as a thin layer which further improves oxygenation of the blood. More specifically, the water pressure is maintained in the water modules at a higher pressure than the blood in the blood modules. This causes a clamping action on the blood modules thus causing the thin layer.

It is therefore one object of the present invention to provide a blood oxygenator with specifically designed blood and water modules.

Yet another object of the present invention is to provide a blood oxygenator with means for joining the fluid-containing modules together so as to prevent accidental leakage of water into blood.

Yet another object of the present invention is to provide a device which is relatively simple in its construction.

The novel features which are believed to be characteristic of the invention, both as to its organization and method of operation, together with further objectives and advantages thereof, will be better understood from the following description considered in connection with accompanying drawings in which a presently preferred embodiment of the invention is illustrated by way of example. It is to be expressly understood, however, that the drawings are for the purpose of illustration and description only and not intended as a definition of the limits of the invention.

BRIEF DESCRIPTION OF THE DRAWINGS

FIG. 1 is a perspective view of the apparatus of the present invention and block diagrams showing the circulatory system and flow paths utilized in connection therewith;

FIG. 2 is a cutaway sectional view taken along lines 2—2 of FIG. 1 and showing the internal configuration of the device of the present invention;

FIG. 3 is an exploded perspective view showing the bottom cover and the water-blood-water module configuration;

FIG. 4 is an enlarged and fragmentary perspective view taken along lines 4—4 of FIG. 3 and showing a water module of the present invention;

FIG. 5 is an enlarged and fragmentary perspective view taken along lines 5—5 of FIG. 3 and showing a blood module of the present invention;

FIG. 6 is a cutaway sectional view showing the blood outlet manifold and the flow path of blood out of the various modules;

FIG. 7 is a cutaway sectional view showing the water inlet manifold and the flow path of water into the various modules;

FIG. 8 is an enlarged and fragmentary perspective view showing a corner of the blood module;

FIG. 9 is a cutaway sectional view taken along lines 9—9 of FIG. 3 showing the water inlet manifold of the present invention; and FIG. 10 is a cutaway sectional view taken along lines 10—10 of FIG. 3 showing the blood outlet manifold of the present invention.

FIG. 11 is a perspective view of gaskets used to separate the water flow from the blood flow.

DETAILED DESCRIPTION OF THE INVENTION

Referring first to FIG. 1, one can see a diagrammatical illustration of the present invention. The subject oxygenator device 10 is shown as having a case 12 having a top 14, a bottom 16 and first and second side members 18 and 20 respectively. In the preferred embodiment of the present invention, the case 12 has a blood inlet 22 disposed adjacent to the top 14 thereof, a blood outlet 24 disposed adjacent the bottom 16 thereof, a water inlet 26 disposed adjacent bottom 16 thereof; and a water outlet 28 disposed adjacent top 14. Also disposed on the case 12 is an oxygen inlet 30 adjacent the top 14 and an oxygen outlet 32 disposed adjacent the bottom 16. While other configurations for the blood, water, oxygen inlets and outlets are of course within the scope of the present invention, the particular configuration, illustrated in FIG. 1 has been shown to be especially useful in the ability of the device 10 to accomplish the necessary oxygenation of the blood and removal of carbon dioxide therefrom as discussed herein. In the preferred embodiment, water is supplied to the device 10 by a water pump heat exchanger 34 such as is well known in the art. Oxygen, in turn, is supplied via an oxygen source 36 as is also well known in the art. Various water supply systems and oxygen systems are discussed in the disclosures of the U.S. Pat. Nos. 3,413,095; 3,834,544; and 3,998,593 which are herein incorporated by reference. Blood is indicated in FIG. 1 as coming from source 38. Such source 38 could be, for example, venous blood from a patient obtained during open heart surgery.

Assuming that such blood is obtained from a patient or blood source 38, it would travel along path 22a to inlet 22 in the device 10. The blood would then flow through the device 10 as hereinafter discussed, and would exit through blood outlet 24 flowing along path 24a back to the patient or blood source 38. In turn, water from water source 34 would enter the device 10 along path 26a by inlet 26 and would travel up towards the top 14 of the device 10 so as to exit out through water outlet 28, traveling back along path 28a to the water source 34. Oxygen obtained from source 36 is caused to travel along oxygen path 30a to oxygen inlet 30 where it then flows between adjacent blood modules and water modules as hereinafater discussed. Upon completion of the journey, oxygen and any gaseous impurities obtained from the blood would exit out oxygen outlet 32 along path 32a where it would either be released to the atmosphere or returned to the oxygen source 36 for purification. Of course, it should be understood that a wide variety of other pathways and additional components, such as purifying systems, reservoirs, and the like are also within the scope of the present invention. In addition, while the device 10 of the present invention is preferably used with a gaseous oxygen stream to supply the blood with oxygen, other gases and/or fluids containing other components can be caused to flow along the oxygen path. In this manner other ingredients can be transferred to and from the blood. If an oxygen-nitrogen mixture is used in the gas phase, the amount of oxygen transferred to the blood can be attenuated.

Referring now to FIG. 2, one can see that case 12 is comprised of first and second sections 170 and 172 respectively, which are joined together by the interlocking action of lip members 174 and 179. Disposed within case 12 are a plurality of blood modules and water modules which are joined together in a parallel and a substantially surface to surface configuration such that the modules are perpendicular with respect to the ground. The modules are sandwiched between a first cover member 50 and a second cover member 52. To maintain and support such configuration, a plurality of supporting rib members 176 are disposed within case 12. In the preferred embodiment, blood is caused to enter a blood inlet manifold 53 disposed on the first cover member 50 adjacent the top 14 of the case 12, flows across the modules and exits out through the blood outlet manifold 54. Water is caused to enter a water inlet manifold 58 (shown in phantom lines and discussed in greater detail herein) disposed on the second cover member 52 adjacent the bottom 16 of the case 12, flows across the modules and exits out through water outlet manifold 59 adjacent the top 14 of the case 12. In the preferred embodiment of the device for an adult, the configuration of the modules is in a water-blood-water arrangement beginning and ending with a water module. It has been found that in order to achieve sufficient oxygenation of the blood, a total of 13 water modules and 12 blood modules are used. It being understood, however, that the number of modules can vary depending on the degree of oxygenation desired, flow rate, and the like. For example, devices for pediatric and neonate use would have fewer modules.

DESCRIPTION OF THE WATER AND BLOOD MODULES

Water module 62, as shown in FIGS. 3 and 4, is comprised of a generally rectangular water frame 63. A first side member 66 and a second side member 68 as well as top 70 and bottom member 72 of the water frame 63 form the rectangular configuration and are, in the preferred embodiment, made out of a rigid plastic such as polypropylene or the like. The water module 62 has a series of water inlet passageways 64 disposed on one side 66 thereof, and a series of water exit passageways 65 disposed on the opposite side 68 thereof in flow communication with a water-impermeable water envelope 80. The water envelope 80 is disposed across each water module 62 so as to permit water to enter by water entry passageway 64 and to exit by water exit passageway 65. Disposed exterior from and across each water envelope 80 is an oxygen screen 82. Oxygen screen 82 helps disperse the flow of oxygen across the water module 62 as hereinafter discussed. The oxygen screen also helps support both the water and blood modules 62 and 84.

Each water module 62 also has a first top series of blood entry through ports 74 and a second bottom series of blood exit through ports 76. These blood exit and entry through ports are disposed through each of the water frames 63, and the frames 63 are arranged such that all blood entry through ports 74 and all blood exit through ports 76 are in axial alignment. In this manner, blood can flow across the top 70 and bottom 72 of each water module 62 as illustrated in FIG. 3 without mixing with the water.

Each water module 62 also includes an oxygen inlet port 78 and an oxygen outlet port 79. These ports 78 and 79 are disposed through the frame 63 on diagonally opposed corners, and are designed as to encourage oxygen to flow across the water module 62 in intimate contact with the blood module 84.

Referring now to FIGS. 3 and 5, the blood module 84 will now be described. The blood module 84 is of similar construction to the water module 62 and has a blood frame 85 of general rectangular configuration with first and second parallel and spaced apart side members 88 and 90, respectively joined to parallel and spaced apart top and bottom members 92 and 94 respectively. In the preferred embodiment, blood entry passageways 86 are disposed on the top 92 of the blood frame 85, and blood exit passageways 87 are disposed on the bottom 94 of the blood frame 85 in flow communication with a gaspermeable blood envelope 100. The blood envelope 100 is disposed across the blood module 84 so as to permit blood to enter through the blood entry passageway 86 adjacent the top 92 and to exit adjacent the bottom 94 through blood exit passageway 87. Disposed exterior from and across the blood envelope 100 is an oxygen screen 82 which performs the same function as discussed in connection with the water module 62.

In order to separate the water stream as it proceeds through the device 10 from the blood module 84, a first series of water entry through ports 96 are disposed on first side member 88 and a second series of water exit through ports 98 are disposed on second side 90. These through ports are arranged and configured so as to permit the flow of water to pass through each blood module 84, but in such a manner as to prevent the water from mixing with the blood. In the preferred embodiment the blood modules 84 are configured such that all the water entry through ports 96 and all the water exit through ports 98 are in axial alignment.

The blood module 84 also has an oxygen inlet port 78 and oxygen outlet port 79 disposed through the module 84 so as to permit the oxygen to flow across the blood module 84 as hereinafter described. These ports 78 and 79 also encourage the flow of escape blood and/or water away from the both the water modules 62 and the blood module 84.

A more detailed description of the modules 62 and 84 will now be presented.

Referring now to FIG. 4 the detailed construction of the water module 62 is shown. As is indicated in FIG. 4, the water entry passageway 64 includes a slot 110 formed in the water frame 63 on first side 66. A section 112 of the water frame 63 also has a plurality of openings 116 disposed therethrough in flow communication with the water envelope 80. These openings 116 are separated by a series of toothlike members 114 producing an overall comblike appearance for the water entry passageway 64. As the water flows through slot 110, a portion thereof will be caused to flow over section 112 and through the water inlet openings 116, beneath arm 122 of the water frame 63, and along channel 124 into the water envelope 80. The water envelope 80, in the preferred embodiment, is formed of first and second water-impervious films 118 and 120 respectively, and includes oxygen screen 82 disposed exterior from the water envelope 80. The water envelope 80 is attached to the water frame 63 by glue or other means so as to be suspended between the various members 66, 68, 70 and 72 in a leak-proof manner. On the second side 68, a water exit passageway 65 is formed (see FIG. 3) which is of substantially similar construction to blood entry passagway 64, i.e., blood exit passageway 65 also includes a slot member 110 and a plurality of exit openings 117 in flow communication with the water envelope 80. Toothlike members 114 are also disposed about the water exit passageway 65.

Referring now to FIG. 5, the details of the blood module 84 will now be discussed. The blood entry passageway 86 also includes a slot 130 extending through the blood frame 85. Slot 130 is formed so as to permit some of the blood to flow across section 132 of the frame 85 and through a plurality of entry openings 136 bounded by a series of toothlike members 134. These toothlike members 134 produce an overall configuration having a comblike appearance. In the preferred embodiment, the blood entry passageway 86 is of similar construction and operates in the same manner as water entry passageway 64. That is, as the blood flows through slot 130, a portion thereof will be caused to flow over section 132, and through the blood entry openings 136, beneath arm 144, and along channel 146 into the blood envelope 100. The blood envelope 100 is comprised of a first semi-permeable membrane 138 and a second semi-permeable membrane 140. Such membranes are well known in the art and permit oxygen to diffuse through the membrane into the blood. In turn carbon dioxide and other gases are permitted to diffuse from the blood out through the first and second membranes 138 and 140. These membranes, 138 and 140, however, do not permit blood to pass therethrough. A blood screen 82 is disposed within the blood envelope 100 and helps disperse the flow of blood through the blood envelope 100. The blood envelope 100 is attached to the blood frame 85 by heat sealing or other means and is suspended between the various members of the blood frame 85 in a leak-proof manner.

In the preferred embodiment, blood entry passageways 86 are disposed along the top 92 of each of the blood frames 85, and the blood exit passageways are disposed along the bottom 92 of each of the blood frames 85. The blood exit passageways 87 are of similar construction to the entry passageways 86, and as shown in FIG. 3, include a slot member 130 and a plurality of exit openings 137 in flow communication with the blood envelope 100. Toothlike member 134 are also disposed about the exit openings 137.

DESCRIPTION OF THE FLOW PATHS

A brief description of the flow paths through the device 10 will now be presented.

Referring to FIG. 3, the general flow paths of water and blood into and out of the device 10, is shown. Before describing the specific flow paths, one can see that in order for the blood or water to pass through the device 10 of the present invention, means must be provided so as to permit the blood and water to pass through or around each of the respective modules. In the preferred embodiment, this is achieved by configuring the blood exit passageways 87 on each of the blood modules 84 in axial and flow alignment with the blood exit through ports 76 on each of the water modules 62. The blood exit passageways 87 and the blood exit through ports 76 form the exit channel for the blood out of the device 10 adjacent the bottom thereof. In turn, the blood entry passageways 86 on each of the blood modules 84 is in axial and flow alignment with the blood entry through ports 74 on each of the water modules 62. The blood entry passageways 86 and the blood entry through ports 74 form an entry channel for the blood across the device 10 adjacent the top thereof.

In the case of water, the water entry passageways 64 on each of the water modules 62 is in axial and flow alignment with the water entry through ports 96 on the blood modules 84. The water entry passageways 64 and the water entry through ports 96 form an entry channel for the water through the device 10 adjacent one side thereof. The water exit passageways 65 are likewise in axial and flow alignment with the water exit through ports 98 on the blood modules 84. The water exit passageways 65 and the water exit through ports 98 form an exit channel for the water through the device 10 adjacent the other side thereof.

Referring first to the blood flow path shown by arrows in FIG. 3, one can see that the blood proceeds adjacent the top 92 of each of the blood frames 85 and flows along the blood entry channel formed by the various blood 84 and water 62 modules. A portion of the blood, however, is permitted to flow through each blood envelope 100 on each of the blood modules 84 towards the bottom 94 thereof. After the blood flows out of the blood envelope 100 through the blood exit passageways 87, it then travels through those remaining blood modules 84 and water modules 62, along the blood exit channel, which it may encounter before it flows into the exit manifold 54. Assuming that there are twelve blood modules 84 and thirteen water modules 62, approximately 1/12 of the blood flow is directed through the blood entry passageways 86 on each blood module 84. The blood proceeding across the first blood module 84 (that module closest to the blood inlet manifold 53) would flow through the blood exit channel formed by the remaining water 62 and blood modules 84. Blood entering the blood module 84 adjacent the blood exit manifold 52 as shown in FIG. 3 would only have to proceed through one water module 62 before reaching the blood exit manifold 54.

Referring again to FIG. 3, one can also see the water flow path indicated by arrows as it proceeds through the various modules. The flow path of water is similar in nature to the flow path for the blood, but differs in that in the preferred embodiment, the water enters adjacent one side of the device 10, flows across the device, and then exits along the other side. More specifically, the water enters through the water inlet manifold 58, and flows along the water entry channel formed by all the blood modules 84 and water modules 62. A portion of the water is directed to flow through each water envelope 80 on each of the water modules 62 from the first side 66 toward the second side 68 thereof. The water then exits out of the water envelope 80 through water exit passageways 65. It now proceeds along the water exit flow channel formed by those remaining water modules 62 and blood modules 84 located between that water module and the water outlet manifold 59.

With respect to the flow of oxygen through the device 10 of the present invention, oxygen is caused to enter the various modules by oxygen inlet 30 which is disposed through the second cover 52 adjacent the top thereof. It is then caused to flow across all of the modules through oxygen inlet port 78 disposed on each module. A portion of the oxygen is directed diagonally across each of the modules toward oxygen outlet port 79 also disposed on each module. The flow of oxygen through the device 10 is such that it is caused to blanket each blood module 84, and more specifically, both sides of the blood envelope 100. When the oxygen flow reaches the first cover 50, it is directed out of the device 10 through oxygen outlet port 32.

Thus, one can see that the blood and water paths are such that only one pass of blood is made through each blood envelope 100 and only one pass of water is made through water envelope 80. While other recycling configurations are within the scope of the present invention, the single pass configuration enables the respective fluid streams to be better isolated one from the other. As discussed hereinabove, it is of great importance to prevent the water stream from entering the blood stream.

Referring now to FIG. 6, a section has been taken through the blood manifold 54 and through some of water modules 62 and blood modules 84 to further illustrate the flow of flood as it exits out of the device 10. In the preferred embodiment, blood would proceed from the blood inlet manifold 53 across the top of the device 10, and along the blood entry channel formed by the alternating blood entry passageways 86 on the blood modules 84, and the blood entry through ports 74 on the water modules 62. As the blood passes across the blood modules 84, a portion of the blood is caused to take a path through each respective blood envelope 100. When it reaches the bottom 92 of the associated blood module 84, the blood is caused to travel across the bottom of the device 10 through the various blood exit passageways 87 and blood exit through ports 76 along the blood exit channel. One problem with the prior art devices was that there was a propensity for the blood and water streams to mix. The device 10 of the present invention, in addition to achieving advantageous simplicity by the use of modular construction, also joins the respective modules together so as to substantially prevent the fluids from mixing. In the preferred embodiment, such separation of the various modules is achieved by providing each water module 62 with grooves 150 and 152 (See FIGS. 4, 5 6 and 7) which circumferentially surround each blood exit through port 76. In turn, each blood exit passageway 87 has outwardly extending tongue members 162 and 164 on each side of the blood frame 65. As shown in FIG. 6, a tongue and grooved configuration is formed by the interdigitation of the tongue members 162 and 164 into the grooves 150 and 152. This tongue and groove configuration prevents the flow of blood from mixing with the water as the blood exits out of the blood envelope 100 and flows along the blood exit channel through the device 10. Likewise, with respect to the blood entry channel, each of the blood entry passageways 86 also has outwardly extending tongue members 162 and 164 on each side of the blood frame 85. This is shown in FIG. 5. The outwardly extending tongue members 162 and 164 circumferentially surround the blood entry passageway 86 and matingly engage the associated grooves 150 and 152 which circumferentially surround the blood entry through ports 74 on the water module 62. To further decrease even the likelihood of leakage as the blood proceeds through the entry channel or the exit channel, gaskets 166 and 168, as shown in FIG. 6, are disposed between the tongues 162 and 164 and the grooves 150 and 152. The specific placement and shape of the gaskets 166 and 168, as more fully shown in FIG. 11, represents a point of novelty of the present invention, and an advancement over the prior art.

Referring now to FIGS. 4 and 7, one can see that with respect to the flow of water into the device 10 through water inlet 60, the mixing of the water stream with the blood stream is likewise prevented by a tongue and groove configuration. With respect to the water stream, each of the water modules 62 has outwardly extending tongue members 154 and 156 which circumferentially surround the water entry passageway 64 as well as the water exit passageway 65. In turn, such tongue members 154 and 156 would matingly engage corresponding grooves 158 and 160 disposed on each side and circumferentially surround the water entry through port 96 and water exit through ports 98 on each of the blood modules 84. Gaskets 166 and 168 are also disposed between the tongue and grooves on each side of the water passageways 64 and 65 to likewise further diminish the probability of any leakage of the water into the blood. Thus, both the water entry channel and water exit channel are protected by the tongue and groove configuration, with each water passageway 84 and 85 circumferentially surrounded on each side of the water module 62 with outwardly extending tongue members 154 and 156 interdigitated in corresponding grooves 158 and 160 on the blood modules 84 which circumferentially surround the water through ports 96 and 98.

Referring now to FIG. 8, the outwardly extending tongue member 162 and groove 158 of a typical blood module 84 is more fully shown. FIG. 8 points out that the tongue member 162 in effect forms a dam 188 about a blood exit passageway 87 and likewise such tongue member, when on a water module, would form a dam member 188 about each of the water entry and exit passageways 64 and 65. While other means for joining the blood module 84 to an water module 62 are of course within the scope of the present invention, the tongue and groove configuration in combination with gaskets has been shown to possess the necessary requirements so as to substantially prevent the leakage of water and blood. This configuration also helps the device 10 to be easily assembled as the tongue and grooves act as keying member for assembly purposes.

FIG. 8 also illustrates another improvement of the present invention over the prior art. On each water module 62 and blood module 84, a depression 182 is formed adjacent the oxygen inlet port 78 as well as the oxygen outlet port 79. This depression 182 is not of arbitrary placement; rather, it enables any blood or water which should possibly leak out of one of the water or blood envelopes, or from the blood or water entry or exit channels, to quickly flow out of the device 10 of the present invention. In this manner, leakage of the water or blood is encouraged to flow out through the oxygen outlet port 79.

Referring now to FIG. 9, a section view of the water inlet manifold 58 is illustrated. As can be seen, in the preferred embodiment the water inlet manifold 58 is disposed on the second cover 52 and has a slot 180 disposed therethrough. In this manner water is permitted to enter into the device 10 so as to flow through all of the various water entry passageways 64 disposed on the first side 66 of each water module 62.

Referring now to FIG. 10, one can see that the blood outlet manifold 54 which is of substantially similar construction to the blood inlet manifold 53. Outlet manifold 54 is mounted on the second cover 52 and has a series of slots 190 disposed therethrough which permits the blood to flow out of the various blood exit passageways 87 as illustrated in FIG. 3.

A detailed explanation of the operation of the device 10 of the present invention will now be presented.

Assume that a patient has been prepared for open heart surgery and the device 10 has been primed as necessary. Blood would be caused to flow from the patient to the blood inlet manifold 53 disposed on the first cover member 50. As the blood enters through blood inlet 22, it passes through the various slots 190 and through the plurality of blood entry passageways 86 as shown in FIG. 3. In the preferred embodiment, a series of eight separate and spaced apart blood entry passageways 86 are disposed on the top 92 of each blood module 84. Likewise eight blood exit passageways 87 are disposed on the bottom 94 of each blood module 84. Since each blood module 84 is bounded on each side by a water module 62, blood would first proceed through a water module 62. This is achieved by positioning on the water frame 63 the same number of blood entry through ports 74 as there are blood entry passageways on the blood modules 84. Each of the blood entry through ports 74 are in alignment with the blood entry passageways 86 disposed on the blood module 84. Once the blood has passed through the blood entry through ports 74, it would meet a first blood module 84.

Referring now to FIGS. 3 and 5, a portion of the blood would flow through a slot 130 and onto the next water module 62, and a portion would be caused to flow over section 132 and through the various blood entry openings 136, each separated by the toothlike members 134. As the blood enters through openings 136, it is caused to flow under arm 144 along channel 146, and then into the blood envelope 100. To ensure that the blood forms a thin layer so as to enhance the ability of the blood to obtain the necessary oxygen or other component, and to transfer the carbon dioxide through the membranes 138 and 140, a blood dispersing screen 142 is disposed within the blood envelope 100. Of course, it is understood that other means for dispersing the blood in the blood envelope 100 are within the scope of the present invention. For example, baffle plates or other similar configurations could also be used so as to ensure the necessary dispersing of the blood throughout the blood envelope 100. When the blood reaches the bottom 94 of the blood module 84, it is caused to flow beneath arm 144 along channel 146 and out through the blood exit openings 137 formed in the blood outlet passageways 87 as shown in FIG. 6.

The blood is now adjacent the bottom of the device 10 and flows along the outlet channel formed by the alternating blood exit passageways 87 in the blood modules 84, and blood exit through ports 76 formed in the water modules 62. This is best shown by reference to FIG. 3. As described in connection with the entry passageways 86, the same number of blood exit through ports 76 are disposed on each water module 62 as there are blood exit passageways 27 on the blood module 84. The blood would proceed across the bottom of the device 10 along the blood exit channel until it came to blood outlet manifold 54 where it would then exit out of the device 10 through exit port 56 and would now be returned in its oxygenated state to the patient.

Blood that did not proceed through the blood module closest to the blood inlet manifold 53 would flow through the next water module 62 as hereinabove described. Again, a portion of the remaining blood would flow down through the blood envelope 100 of the next blood module 84. The blood which did not proceed down the second blood module 84, would continue to flow along the blood inlet channel formed by the blood entry passageways 86 and the blood entry through ports 74. Ultimately, all the blood would be caused to make one pass through a blood envelope 100 and would then proceed to the blood outlet manifold 54.

As discussed hereinabove, it has been found that extracorporeal blood in many instances should be heated or cooled depending on the operating criteria. The device 10 of the present invention enables such heating and/or cooling to take place. This is achieved by the use of water which flows through a plurality of water modules 62. In addition, inasmuch as the water modules 62 are positioned between adjacent blood modules 84 and further because the water modules 62 are disposed between the first and second cover members 50 and 52, the water modules 62 help position the blood modules 84 and help form a thin layer of blood in each blood envelope 100.

Referring now to FIGS. 3 and 7, one can see that the water is caused to enter the device 10 through water inlet port 60 on the water entry manifold 58 disposed on the second cover 52. As pointed out hereinabove, the first module positioned adjacent the second cover 52 is a water module 62. In the preferred embodiment, water is caused to enter the device 10 adjacent the bottom thereof so as to flow in a generally upward direction and toward the first cover 50 at substantial right angles with respect to the blood flow across each module. Upon entering into the device 10, as shown in FIGS. 3 and 4, a portion of the water would be directed through the water module 62 and the next adjacent blood module 84 along the water entry channel. A portion of the water would be directed into the water envelope 80 via the water entry passageway 64. More specifically, a portion of the water would be directed over section 112, under arm 122, along channel 124, and through the various water entry openings 116 into the water envelope 80. In the preferred embodiment, two separate water entry passageways 64 are disposed on the first side 66 of the water module 62 and two water exit passageways 65 are disposed on the second side 68 of the water module 62. An identical number of aligned water entry through ports 96 and water exit through ports 98 are disposed on the adjacent water modules 84.

The water would then travel between the respective water impervious films 118 and 120 and would exit out the water envelope 80 adjacent the opposite side 68 thereof. Next the water would then flow out along channel 124 through exit openings 117, and into the water exit passageway 65. As the water exits from each of the water modules 62, it is not recycled; rather it is caused to travel along the water outlet channel formed by water exit through ports 98 on the blood modules 84 and the water exit passageways 65 on the water modules 62. Ultimately, the water would flow into the water outlet manifold 59 and would exit out of the device 10 through water outlet port 28. That portion of the water which did not flow through the first water module 62 adjacent the water inlet manifold 58, would flow through the adjacent blood module 84 to the next water module 62 where again a portion would flow through the associated water envelope 80. Ultimately, all the water that flows into the device 10 is caused to make one pass through an associated water module 62.

In order to achieve the necessary oxygenation of the blood and removal of the carbon dioxide, preferably each of the blood modules 84 and the water module 62 have an external oxygen screen 82 disposed on one side thereof. In this manner, each blood envelope 100 can be disposed between the oxygen screens 82. Oxygen is caused to enter adjacent the top of the device 10 through oxygen inlet 30 and flows diagonally across each of the water modules 62 and blood modules 84. The oxygen entry ports 78 and exit ports 79 on each of the modules are configured such that all entry ports 78 and all exit ports 79 are in axial alignment to encourage the flow of oxygen through the device 10. As the oxygen flows across the modules it forms a blanket on both sides of each blood module 84. The result is that the passage of oxygen across each of the blood modules 84 is sufficient to achieve the necessary oxygenation of the blood, and at the same time removal of carbon dioxide. After the oxygen has proceeded across the modules, it is channeled to oxygen outlet port 32 where it is caused either to be recycled, captured, or released. While no specific oxygen manifold is shown in the drawings, inlet port 30 and outlet port 32 act as an inlet manifold and outlet manifold respectively. Other types of manifold configurations are within the scope of this invention.

As will be recalled, one of the distinct problems with prior art devices was that the various configurations did not achieve the necessary separation of the blood and water streams. This can cause significant problems. As illustrated in FIGS. 6, 7 and 8, the present invention achieves the necessary separation by installing grooves 150 and 152 on the water module 62 about the blood through ports 76 and 78, and positions tongue members 154 and 156 on each water module 62 so as to surround the water passageways 64 and 65. Further, with respect to the blood modules 84, similar tongue members 162 and 164 are disposed about the blood passageways 86 and 87. In turn, grooves 158 an 160 are disposed on each blood module 84 about the water through ports 96 and 98. Referring to FIGS. 6 and 7, one can see the interdigitating action achieved by the series of tongue and groove configurations. Note that because each of the entries and exits into and out of the respective blood and water envelopes are circumferentially surrounded on each side by interlocking members, mixing of blood with water is substantially precluded.

To further diminish the likelihood of a possible leak, especially of water into blood, sealing gaskets 166 and 168 are disposed between respective tongue and grooves. In the preferred embodiment, gaskets 166 and 168, as shown in FIGS. 4 and 11 are made of a flexible gasket material as is well known in the art. The gaskets 166 and 168 are preferably bonded between adjacent modules. To achieve this bonding, electrically magnetically activated gasket material is used. It is to be understood, however, that other means for sealing and bonding adjacent modules together are within the scope of this invention.

Yet a further failsafe-type system is built into the device 10 of the present invention. Assume that, for a variety of reasons, one of the water envelopes 80 has been caused to rupture thereby permitting water to travel externally from the water envelope 80. Besides completely isolating the blood flow (i) by the use of the semi-permeable membranes 138 and 140; (ii) by the tongue and groove joining configuration; and (iii) by the use of gaskets 166 and 168, the flow path of this now escaped water is caused to be channeled away from both the water modules 62 and the blood modules 84. In the present invention, this is achieved by directing the escaped water flow toward the bottom of the device 10 encouraged by gravity. The flow of oxygen through the device 10 would further encourage the escaped water to exit from the device via the oxygen outlet 32. Thus, this ability to constantly remove any escaped water significantly decreases the probability that such water could find its way into the blood flow path.

Another shortcoming with the prior art devices was the failure of such devices to detect at an early time when a blood leak has occurred in the device. The present invention solves this problem by encouraging escape blood in the same manner as escaped water so as to exit out of the oxygen outlet 32. Obviously, if the operator sees any red fluid flowing out of the oxygen outlet 32, he would know that a blood leak had occurred and the necessary steps to correct such event could then be taken.

While the present invention has been described with respect to a specific embodiment, the principles thereof are adapted to a plurality of applications. For example, in the preferred embodiment, the oxygen screen 82, and blood screen 142 are both made of mesh polypropylene. Likewise, the water frame 63 and the blood frame 85 are also made out of a similar polypropylene material. Of course, other similar plastic materials are within the scope of the present invention. With respect to the semi-permeable membranes 138 and 140, Celgard 2402 (microporous polypropylene) is used. Other microporous materials as are well known in the art are also within the scope of this invention. For the water envelope 80, the preferred material is polypropylene film. Finally, the present invention is configured to provide approximately ½ to 3 square meters of effective membrane (138 and 140) area, and is designed to operate up to about 8 liters of blood per minute with a gas flow of 3 to 20 liters per minute. Other flow rates, various membrane areas and mixtures of gases are within the scope of this invention. The normal membrane area of the device 10 for an adult is approximately 2 square meters, and 3 to 6 liters of blood per minute is the normal flow rate. This invention, therefore, is not to be limited to the specific embodiments hereinabove discussed.

What is claimed is:

1. A membrane device having particular utility as a blood oxygenator, comprising:
    a plurality of blood modules and water modules arranged in an alternating configuration, said blood modules defining a flow path for blood through and across each blood module, and said water modules defining a flow path for water through and across each water module,
    each said blood module and water module comprising an integral frame having (i) an envelope suspended within and surrounded by said frame; (ii) an oxygen inlet port and an oxygen outlet port configured such that oxygen is caused to flow between adjacent modules; (iii) tongues and grooves located on each said frame such that the tongues of one frame are disposed in associated grooves of an adjacent frame and circumferentially surround the blood flow path through each blood module and the water flow path through each water module; and (iv) a recessed area means formed in each said frame adjacent said oxygen outlet port for directing any water leakage from a water module out of the device through the oxygen outlet ports, or to the exterior of the modules or to both and away from the blood flow path; and
    elongated sealing means disposed between the tongues and associated grooves of adjacent frames such that if water leaks from a water module said sealing means will cause such water leakage to be directed to said recessed area means or to the exterior of the modules or to both, whereby such leakage will be prevented from entering the blood flow path.

2. A device according to claim 1 wherein said oxygen inlet ports and oxygen outlet ports are in axial alignment through each said water module and each said blood module.

3. The device according to claim 1 wherein said sealing means are gaskets.

4. A disposable membrane blood oxygenator comprising:
    a series of water modules and blood modules joined together in an alternating configuration, said blood modules defining a flow path for blood through and across each blood module, and said water modules defining a flow path for water through and across each water module;
    each said water module comprising a generally rectangular integral water frame and a water envelope suspended within and surrounded by said frame, each said water frame having water inlet means and water outlet means in flow communication with said water envelope;
    each said blood module comprising a generally rectangular integral blood frame and a blood envelope joined thereto, each said blood frame having blood inlet means and blood outlet means in flow communication with said blood envelope;
    each said blood module and water module further having (i) oxygen inlet means and oxygen outlet means configured such that oxygen is caused to flow between adjacent modules and across each respective envelope; and (ii) grooves located on each said frame; (iii) a recessed area means formed in each said frame adjacent said oxygen outlet means for directing any water leakage from a water module out of the device through the oxygen outlet means, or to the exterior of the modules or to both and away from the blood flow path; and
    sealing means disposed in the grooves between adjacent modules so as to circumferentially surround each said water inlet means and water outlet means and each said blood inlet means and blood outlet means such that if water leaks from a water module said sealing means will cause such water leakage to be directed to said recessed area means or to the exterior of the modules or to both, whereby such leakage will be prevented from entering the blood flow path.

5. The oxygenator according to claim 4 wherein each said water module has an oxygen dispersing screen disposed across said water envelope.

6. The oxygenator according to claim 4 wherein a blood screen for dispersing the flow of blood is disposed within each said blood envelope.

7. The device according to claim 4 wherein said sealing means comprise elongated gaskets.

8. The oxygenator according to claim 4 wherein each said water frame has an upper surface and a lower surface with said water inlet means disposed through said upper surface and said recessed area means formed on said lower surface.

9. The device according to claim 4 wherein tongues are located on each said frame such that the tongues of one frame are disposed in associated grooves of an adjacent frame.

10. The device according to claim 9 wherein the tongues and associated grooves of adjacent frames circumferentially surround each said water inlet means and water outlet means.

11. A membrane blood oxygenator comprising:
a series of water modules and blood modules joined together in an alternating configuration, said blood modules defining a flow path for blood through and across each blood module, and said water modules defining a flow path for water through and across each water module;
(a) each said water module comprising a water frame having top and bottom members integrally joined to opposed side members, a water-impervious envelope joined to and surrounded by said water frame, water entry passageway means disposed along one of said side members in flow communication with said elongated water-impervious envelope, water exit passageway means disposed along the other side member in flow communication with said water-impervious envelope, blood entry and exit through ports disposed along said top and bottom members, respectively, of each said water frame, grooves formed in said water frame circumferentially surrounding each said blood entry and exit through port, oxygen ports configured such that oxygen is caused to flow between adjacent modules and across each respective envelope, and a recessed area means formed in each said water frame adjacent at least some of said oxygen ports for directing any water leakage from a water module out of the device through the oxygen ports, or to the exterior of the modules or to both and away from the blood flow path;
(b) each said blood module comprising a generally rectangular blood frame having top and bottom members integrally joined to opposed side members, an elongated gas-permeable envelope joined to said blood frames, blood entry passageway means disposed along said top member in flow communication with said elongated gas-permeable envelope, blood exit passageway means disposed along said bottom in flow communication with said gas-permeable envelope, water entry and exit through ports disposed along each said side members, respectively, of each said blood frame, grooves formed in each said blood frame circumferentially surrounding each said water entry and exit through ports, oxygen ports configured such that oxygen is caused to flow between adjacent modules and across each respective envelope, and a recessed area means formed in each said blood frame adjacent at least some of said oxygen ports for directing any water leakage from a water module out of the device through the oxygen ports, or to the exterior of the modules or to both and away from the blood flow path; and
(c) sealing means disposed in the grooves between adjacent modules so as to circumferentially surround each said water entry and exit thorugh port and each said blood entry and exit through port such that if water leaks from a water module said sealing means will cause such water leakage to be directed to said recessed area means or to the exterior of the modules or to both, whereby such leakage will be prevented from entering the blood flow path.

12. The membrane oxygenator according to claim 11 wherein each said water frame has an upper surface and a lower surface with said water entry passageway means disposed through said upper surface and said recessed area means formed on said lower surface.

13. The membrane oxygenator according to claim 11 wherein said sealing means comprise elongated gaskets.

14. The membrane oxygenator according to claim 13 wherein each said frame has tongues formed thereon such that the tongues of one frame are disposed in associated grooves of an adjacent frame.

15. A membrane blood oxygenator comprising:
(a) a housing;
(b) first and second covers disposed within said housing, each said cover having a blood manifold, a water manifold and an oxygen manifold for directing, respectively, blood, water and oxygen into and out of said housing;
(c) a series of water modules and blood modules sandwiched between said covers in an alternating configuration, the module adjacent said first cover and said second cover being a water module,
each said water module comprising an integral water frame, and a water envelope joined to and surrounded by said water frame, said water frame having water entry passageway means and water exit passageway means in flow communication with said water envelope;
each said blood module comprising an integral blood frame and a blood envelope joined thereto, said blood frame having blood entry passageway means and blood exit passageway means in flow communication with said blood envelope;
each said blood module and water module further having (i) oxygen inlet means and oxygen outlet means configured such that oxygen is caused to flow between adjacent modules and across each respective envelope; and (ii) grooves located on each said frame; (iii) a recessed area means formed in each said frame adjacent said oxygen outlet means for directing any water leakage from a water module out of the device through the oxygen outlet ports, or to the exterior of the modules or to both and away from the blood flow path; and
sealing means disposed in the grooves between adjacent modules so as to circumferentially surround each said water entry and exit passageway means, and each said blood entry and exit passageway means such that if water leaks from a water module said sealing means will cause such water leakage to be directed to said recessed area means or to the exterior of the modules or to both, whereby such leakage will be prevented from entering the blood flow path.

16. A membrane oxygenator according to claim 15 wherein each said water frame has an upper surface and a lower surface with said water entry passageway means disposed through said upper surface and said recessed area means formed on said lower surface.

* * * * *